Patented Jan. 23, 1934

UNITED STATES PATENT OFFICE 1,944,856

GLASS RESISTANT REFRACTORY AND BATCH COMPOSITION FOR PRODUCING SUCH A REFRACTORY

Paul G. Willetts, West Hartford, Conn., assignor to Hartford-Empire Company, Hartford, Conn., a corporation of Delaware No Drawing. Original application February 21, 1930, Serial No. 430,459. Divided and this application April 16, 1932. Serial No. 605,785

6 Claims. (Cl. 106—10)

This application is a division of my copending application Ser. No. 430,459, Patent No. 1,859,227, granted May 17, 1932 filed February 21, 1930, and a continuation in part of my copending application Serial No. 345,614, filed March 8, 1929.

The present invention relates to refractories resistant to the attack of molten glass such as glass feeder parts and other glass-contacting implements, and particularly massive objects, such as tank blocks. Further, the invention relates to batch compositions, especially adapted for use in the manufacture of such refractories.

The general object of the present invention is to provide a novel refractory of the above character possessing a fine-grained or vitreous structure free from channels and voids, and of low porosity, such minute pores as are present being uniformly distributed. Such refractory also preferably consists of two phases only, microscopic aluminum silicate crystals and a glassy matrix, such crystals being uniformly dispersed in the glassy matrix, no crystalline silica being present.

A further object of the invention is to provide a novel glass resistant refractory derived from grog and a binder of substantially the same refractoriness, but in which the interaction therebetween has been such as to substantially destroy the identity of the grog, thus providing a body of such uniform character that portions of the grog or binder are not separately detached in use, but both are slowly worn away at substantially the same rate.

Such properties of glass contact refractories, such as tank blocks, are very advantageous as a practical matter; they prevent localized corrosion or pitting such as occurs with ordinary tank blocks, resulting in early failure and shutdown of the tank for repairs; they also prevent "stoning" or the dislodging of particles of large size which are entrained in the glass, and remain therein forming defects or "stones" in the finished glassware. By avoiding these and other defects which commonly result from the use of ordinary tank blocks, the manufacturer employing the refractories of the invention is able to operate his tank for a relatively long period, and to produce glassware of better quality and more economically than heretofore.

Another object of the invention is to provide a novel glass contact refractory of such chemical composition that it is exceptionally resistant to the corrosive action of molten glass. This object may be attained first by maintaining the total iron and alkali metal oxide content below a certain critical value, such as approximately 1.5%, and second by providing such a content of silica that a desirably large amount of glassy matrix is formed which dilutes the above and other oxides, substantially all of which are dissolved in the matrix. This results in a matrix of high softening point, and correspondingly high resistance to glass attack. Preferably other impurities such as lime, magnesia, and titania are present in my novel refractory only in such amounts as result from the use of raw starting materials of good quality, without the addition of such impurities as batch ingredients.

Another object of the invention is to provide a glass contact refractory which, when used as tank blocks or the like, produces glass exceptionally free from color. This results from the presence of only a small amount of iron oxide and/or the character or degree of oxidation of the iron of such oxide.

The above and other objects are attained to greater or less extent in the use of novel refractories of the character, and produced by the novel process and from the novel batches, described and claimed in my copending application Serial No. 345,614.

A more specific object of the present invention is to provide a refractory which may be produced from cheaper materials than that of my last named application, and which, though enriched by silicious material to increase the amount of glass matrix, has a higher alumina content, and a higher content of aluminum silicate crystals.

Another object of the invention is to provide a novel batch composition from which the novel refractory may be produced, and which in addition to being cheaper, as above stated, affords a wider margin of control in firing, particularly in the case of large objects such as tank blocks. It is very difficult to fire such large massive objects at a temperature sufficiently high to develop the above-described properties, especially when the objects are shaped by dry-pressing. This results from the requirements of "critical conditions", due to mechanical and chemical dehydration, oxidation, and decomposition, which if not complied with, are apt to result in cracking, loss of shape, and other defects in the finished objects. Such requirements are largely eliminated by the novel batch composition of this invention, so that a relatively wide range of control in firing is obtained.

Two types of products and respective processes for preparing them will be described as examples of the invention: first, the high silica product described in my copending application Serial No. 345,614, and known as the "901-D" type; and second, the improvement thereon, known as "901-DB".

1. The 901-D type

For making one kind of dry-pressed product referred to herein as "901-D", I may employ a batch mixture consisting, in dry or calcined equivalents, of about 75% of washed Georgia Klondike white kaolin, which is mined near McIntyre, Wilkinson County, Georgia, 17% of ground potters' flint and 8% of an Arkansas clay, described as No. 23 on pages 24 and 25 of Technologic Paper No. 144 of the U. S. Bureau of Standards of January 28, 1920. This clay contains a considerable quantity, about 55%, of exceedingly fine-grained silica and is characterized by low shrinkage and by the fact that it does not "overburn" or bloat. The composition of these three ingredients is indicated in the following table, which gives analyses of typical samples:

|  | Georgia Klondike white kaolin (ignited) | Arkansas clay No. 23 (ignited) | Potters' flint |
|---|---|---|---|
| $Al_2O_3$ | 45.35 | 20.41 | 0.32 |
| $SiO_2$ | 52.30 | 72.75 | 99.35 |
| $TiO_2$ | 1.86 | 1.14 |  |
| $Fe_2O_3$ | 0.50 | 2.59 | 0.03 |
| $CaO$ | trace | 1.02 | 0.10 |
| $MgO$ |  | 0.95 |  |
| $Na_2O$ | 0.07 | 1.22 |  |
| Loss on ignition |  |  | 0.20 |
|  | 100.08 | 100.08 | 100.00 |

These ingredients are mixed in the raw state. A grog is first prepared by mixing about 90 parts of the Georgia Klondike kaolin and 10 parts of the Arkansas clay No. 23, both ingredients being first ground exceedingly fine, suitably fine enough to pass through a standard U. S. No. 325 screen. The ground kaolin and the Arkansas clay are mixed as thoroughly as possible in the presence of water, by blunging, pugging or other approved methods, so as to produce intimate association of the ingredients. Since it is important that the iron content of the final product be kept as low as possible, it is desirable that the materials be ground in a rubber-lined mill and mixed in a porcelain-lined pug mill or other mixing apparatus having non-ferrous surfaces. The mixed material is formed into pieces suitable for handling which are dried and are calcined at a temperature sufficient to develop microscopic crystals, typically about 2850° F.

The calcined grog material is broken down to such fineness as to pass through a standard U. S. No. 24 screen. A binding mixture is made from about 65 parts of the raw Georgia Klondike kaolin referred to above, 5 parts of the Arkansas clay and 30 parts of potters' flint. The Klondike kaolin and Arkansas clay are ground as before, to exceeding fineness, suitably sufficient to pass through a standard U. S. No. 325 screen, and the potters' flint may be ground to similar fineness or may be used in a condition, readily obtained commercially, in which practically all passes through a No. 100 screen and all but about 7% passes through a No. 300 screen. The ingredients are intimately mixed, as in the case of the grog material, and the mixing is preferably carried out by means of a pug mill or other mixing apparatus having non-ferrous surfaces, in order to prevent contamination of the material with iron, which is readily abraded from iron mixing surfaces by the flint present in the material.

The final assembly for the blocks is made by mixing about 17 parts of the grog with about 20 parts of the binder, these proportions corresponding to about 46% of the grog and 54% of the binder. This mixture is formed into the blocks or other shapes desired, which are preferably dry-pressed under a pressure of the order of 5 tons per square inch. The material, when pressed, should contain about 6% to 12% of water. The blocks or other articles are then dried and fired at a temperature of about 2850° F.

Dry-pressing is considered to be essential in making this particular product, because the materials, before firing, have little or no plasticity or mechanical strength, either wet or dry. Therefore the blocks cannot be made by ordinary methods of soft mud molding or stiff mud molding or by pugging and extrusion.

It will be noted that in this particular product all of the added silica, in the form of flint, is incorporated in the binder and not in the grog. This gives a matrix which is materially higher in silica than the grog and increases the resistance of the product to solution, shrinkage, and spalling.

The silicious product described above is white in color, or nearly so, is dense, and has a bulk porosity less than 1%, and a total porosity of less than 10%, the pores which are present being small, round and enclosed by dense walls. This product is further characterized by its high silica content in proportion to its effective life in contact with molten glass, by its low content of iron and alkali metal fluxes, and by an internal structure consisting of crystals which are uniform in size and very minute, typically about .02 mm. x .003 mm. in size, distributed uniformly in a matrix constituting from 40% to 75% of the mass and composed wholly of amorphous glassy material which is low in fluxes and contains no crystalline silica. Its fusion point is above 3100° F.

This product is also characterized by the presence within it of two phases only, typically mullite crystals and glass. This indicates the complete conversion of the starting materials, no part of which is distinguishable in the final product. Other high-temperature refractory products, heretofore proposed, often contain at least three phases, such as mullite, glass and quartz, mullite, glass and crystobalite, mullite, corundum and glass, etc.

The fine-grained and dense structure, and the microscopically small and uniformly distributed crystals, are considered to be the result of the extremely fine subdivision and intimate mixture of the starting materials and the development of the crystals in situ at a firing temperature short of fusion. Under these circumstances the crystals cannot grow beyond microscopic size, as would happen if the ingredients were not finely subdivided, or if the mixed material were heated to fusion.

I have determined by actual test of this silicious product in contact with molten glass of an ordinary soda-lime type, that the solution of the refractory material in the glass does not materially distort the index of refraction of the glass as other glass-engaging refractories will do, especially such as are highly aluminous. This avoids or reduces to a minimum the formation of cords and streaks in the glass, which result from the solution of other refractories.

2. The 901-DB type

Considering now the details of the 901-DB type of product embodying the invention, one example of the mineral composition of the final assembly or batch composition which may suitably be employed, is as follows:

| | Per cent |
|---|---|
| Non-plastic kaolin | 62.5 |
| Plastic bond clay | 30 |
| Feldspar | 7.5 |

The non-plastic kaolin may be of the character of Georgia Klondike white kaolin, which is mined near McIntyre, Wilkinson County, Georgia, and which is a soft, white and non-plastic kaolin. The plastic bond clay may be of the character of Georgia G₁ clay, which is a plastic clay and may be obtained from the Savannah Kaolin Co. at Gordon, Georgia. These clays or clays similar thereto respectively are described in Bulletin 252 of the U. S. Bureau of Mines, pages 15, 41 and 42. Any well-known commercial feldspar may be employed, such as that obtained from a deposit at Bedford Hills, N. Y.

The Georgia Klondike kaolin tends to offset the shrinkage of the plastic bond clay, and performs the further function of adding to the silica content of the product and producing rigidity at high firing temperatures and under high temperature conditions in service. This kaolin alone does not become impermeable below 2800° F. and has only slight mechanical strength when raw. It has a very small firing shrinkage and a high softening point (i. e. Cone 34).

The G₁ clay has a considerable degree of plasticity and performs the function in this mixture of still further adding to the silica content and producing rigidity under heat, but is primarily used to give the initial mixture sufficient temporary strength for molding and handling. The G₁ clay also contributes to the final mechanical strength of the product. It too has a high softening point (i. e. Cone 34).

The feldspar likewise adds to the silica content of the mixture and thus increases the amount of glassy matrix, but its primary purpose is to control the rate and range of vitrification and the viscosity of the glass formed during firing and the viscosity of the glass in the finished body, and to offset the volume changes or effects thereof caused by the clays. The feldspar has a high viscosity which retards its inter-action with the surrounding clay grains, and it has a wide temperature range of vitrification and hence widens the range of the vitrification of the mixture as a whole; it tends to prevent warpage or cracking during firing, and permits relatively rapid annealing of the blocks without injury thereto.

It should especially be remarked that the amount of feldspar which is added to the batch is relatively small and is selected according to its contents of iron and alkali metal oxides and according to like contents of the clays or kaolins, so that when the batch is subjected to fabrication as hereinafter specified, or to a similar ceramic process, the finished objects will contain a minimum of such deleterious oxides. At the same time, of course, the amount of feldspar used must be sufficiently large to eliminate critical firing (and annealing) conditions.

The compositions of the three ingredients above described are indicated in the following table, which gives analyses of typical samples:

| | Georgia Klondike white kaolin | Georgia G₁ clay | Bedford feldspar XX |
|---|---|---|---|
| Al₂O₃ | 39.19 | 36.59 | 19.31 |
| SiO₂ | 45.24 | 44.75 | 66.28 |
| TiO₂ | 1.61 | 1.56 | |
| Fe₂O₃ | 0.43 | 1.22 | 0.067 |
| CaO | trace | 0.42 | 0.17 |
| MgO | | 0.17 | |
| Na₂O and K₂O | 0.06 | 0.10 | 13.97 |
| Loss on Ignition | 13.75 | 15.63 | 0.20 |
| | 100.28 | 100.44 | 100.00 |

The process employed in fabricating the novel refractory material embodying the present invention is or may be identical with that disclosed and claimed in my prior application, Ser. No. 430,459, and involves the preparation of a grog and of a binding mixture, and the mixing of the grog and the binder in suitable proportions to form a final assembly which is dry pressed or suitably molded into the final shape desired.

The preparation of the grog

One example of a batch mixture which may suitably be employed for the grog in carrying out my invention is as follows:

| | Parts |
|---|---|
| Georgia Klondike kaolin | 62.5 |
| Georgia G₁ clay | 30 |
| Feldspar | 7.5 |

The three ingredients for the grog first are ground exceedingly fine, suitably fine enough to pass through a standard U. S. No. 325 screen.

To indicate the degree of fineness to which I prefer to sub-divide starting materials, it may be noted that the standard No. 325 screen referred to above is identified by the U. S. Bureau of Standards as having a sieve opening of .044 mm. (.0017″), a wire diameter of .036 mm. (.0014″), with a tolerance in average opening of plus or minus 8%, a tolerance in wire diameter of minus 15 to plus 35%, and a tolerance in maximum opening of 90%. See Bureau of Standards Specifications for Sieves, U. S. Standard Sieve Series.

The ground kaolin, G₁ clay, and feldspar are mixed as thoroughly as possible in the presence of water, by blunging, pugging, or other approved methods, so as to produce intimate association of the ingredients. Since it is important that the iron content of the final product be kept as low as possible, it is desirable that the materials be ground in a rubber-lined mill and mixed in a porcelain-lined pug mill or other mixing apparatus having non-ferrous surfaces. The mixed material is formed into pieces suitable for handling, which then are dried and are calcined at a temperature sufficient to develop microscopic crystals, typically at about 2850° F.

The calcined grog material is broken down to such fineness as may be desired, suitably fine enough to pass through a standard U. S. No. 24 screen, although coarser or finer grog may be employed.

Microscopic examination of grog produced in the above manner under high power (i. e. 520x) shows that it is composed of extremely minute crystals of aluminum silicate uniformly distributed in a glassy matrix. In some cases, the glassy matrix may contain a few residual quartz splinters, which, however, are dissolved when the grog is introduced into a final assembly and again subjected to high temperature, as described hereinafter. The grog is very homogeneous microscopically and macroscopically, is well vitrified, and hence of low porosity and high density.

The use of the feldspar in preparing the grog makes it possible to obtain the above described transformation at a lower temperature and with greater ease than if the clays were fired alone. This effects economy in fuel consumption. Moreover, the derivative of the feldspar assists in the union of the grog with the binder, without however impairing the homogeneous character of the grog and the finished product.

*Preparation of the binder*

The binding mixture may consist of the same batch composition as the grog, the proportions of the ingredients being preferably the same as in the grog mixture, although these proportions may be varied somewhat if desired. The Klondike kaolin and the $G_1$ clay are ground as before, to exceeding fineness, suitably to pass through a standard U. S. No. 325 screen, and the feldspar likewise may be ground to similar fineness, or may be used in the fine condition in which it is obtained commercially, both for the grog and for the binding mixture.

The ingredients are intimately mixed, as in the case of the grog material, and the mixing preferably is carried out by means of a pug mill or other mixing apparatus, having non-ferrous surfaces, in order to prevent contamination of the material with iron, which is readily abraded from iron mixing surfaces by the hard particles of the ingredients.

*Preparation and shaping of the final assembly*

The final assembly for the blocks or other objects preferably is made by mixing 65 parts of the grog with 35 parts of the binder. This mixture is formed into the blocks, or other shapes, preferably by dry pressing under a pressure of the order of 1 to 2 tons per square inch. The material, when pressed, should contain about 6% to 12% of water.

The blocks or other articles are then dried and fired to complete vitrification and partial or incipient fusion but without general fusion. They may, for example, be fired to a temperature of about 2850° F.

Dry pressing is preferably employed in making refractory products according to the present invention, because the materials as assembled, before firing, have little or no plasticity or mechanical strength, either wet or dry. Therefore, the blocks cannot be made by ordinary methods of soft mud molding, or stiff mud molding or by pugging and extrusion, unless the amount of plastic bond clay is increased to permit shaping by soft mud or stiff mud molding. This may be done if desired.

The final assembly above described has been successfully dry-pressed to form objects varying in size and shape from small feeder parts such as orifice rings to tank blocks of the greatest thickness (such as 12 inches), and such objects have been successfully fired with few failures. These attainments are due largely to the composition and character of the batch composition.

The products of the present invention are white in color or nearly so, are dense, and are of low porosity. The pores which are present are small, round, and enclosed by dense walls, and are uniformly distributed throughout the mass. They have a bulk specific gravity of as high as 2.448, true specific gravity 2.72, porosity by absorption of 8% to 0% (the weight of water absorbed into the open pores in terms of the dried weight) and an apparent porosity of less than 8% (the weight of the water absorbed in the open pores in terms of the exterior volume). Certain special duty refractories may have a higher porosity (say 15%) depending upon the requirements of practice.

Refractories embodying the invention are further distinguished by the extensive reaction between grog and binder which is such that the identity of the grog is substantially lost and the grog and binder cannot be separated mechanically or by the corrosive action of the molten glass thereon. Consequently, such refractories do not "throw stones". This has been verified by actual commercial use of tank blocks embodying the invention, the glass produced being remarkably free from "stones" and other defects commonly caused by ordinary tank blocks, due to the separation of the grog, or large pieces of material, from the blocks.

The novel material of the invention is further characterized by an internal or petrographic structure consisting of microscopic aluminum silicate (mullite) crystals which are substantially uniform in size, and a glassy matrix, in which such crystals are uniformly distributed, both the body as a whole and the glassy matrix containing no free or crystalline silica such as quartz. In some samples of the refractory the maximum length of the mullite crystals is about 0.030 mm. and the maximum width is about .006 mm. the crystals occurring in well developed, elongated, and prismatic form.

Because of the small size and relatively uniform distribution of the crystals in the glassy matrix, and the interlocking of the crystals, it is impossible to determine by a microscopic examination the exact amounts of crystals and glass respectively which are present in the body. In fact, there is no known method by which the relative amounts of crystals and glass in a refractory like that embodying the invention can be ascertained exactly. The crystals are so intimately associated with the glass that it is impossible to separate them by chemical or mechanical methods, as is the case with certain other types of refractories. However, it has been reliably estimated that the body consists of between 33% and 50% crystals, and 67% to 50% glass by volume. Therefore, the crystals constitute between about 37% and about 57%, and the glass between 63% and 43% of the body by weight.

Such petrographic structure has the advantage of offering uniform resistance to the attack of the molten glass, or in other words, a refractory of such structure wears away very evenly and very uniformly, no particles or crystals ever appearing in the finished glassware as "stones" or specks, such as are produced from refractories containing large crystals of mullite or corundum. The crystals in applicant's refractory are so small and so intimately associated with each other and with the binder that they are dissolved in the glass before they are detached from the body, or if detached, dissolve in the glass long before such glass is delivered from the tank.

The refractory product of the present invention is remarkably distinguished from prior refractories with respect to its low total content of iron, alkalie, and alkaline oxides or fluxes, especially in view of the actual addition of feldspar containing an appreciable amount of alkali metal oxide. This may be due to the firing of the batch to high temperature, the ingredients being so finely divided as to permit some of the alkali metal oxide to volatilize from the body.

The composition of a typical finished object prepared according to the example given above is indicated in the following table:

| | Per cent |
|---|---|
| $Al_2O_3$ | 43.90 |
| $SiO_2$ | 53.58 |
| $TiO_2$ | 1.75 |
| $Fe_2O_3$ | .76 |
| CaO | .00 |
| MgO | .00 |
| $Na_2O$ | .68 |
| Ignition loss | .01 |
| Total | 100.68 |

Ordinary commercial tank block has a total content of 2.75% of iron and alkali metal oxides, whereas the above-described product of the present invention has a total content of only 1.44% of iron, alkalie, and alkali metal oxides.

It is preferred to maintain the total content of iron and alkali metal oxides (sodium and potassium oxides) below approximately 1.5% because it has been found by experiments and tests that when this approximate value is exceeded, there is a surprisingly great decrease in the resistance of the refractory to glass attack. For similar reasons, it is preferred that the total iron, alkali, and alkaline earth metal oxides not exceed approximately 1.5%, although in some cases this total may be as high as approximately 2% without appreciably affecting the resistance of the material to glass attack. In fact, the presence of small amounts of the alkali and alkaline earth metal oxides in the raw starting materials, (corresponding to the above limits of composition of the end product), is advantageous in that the firing of the finished objects is assisted thereby in somewhat the same manner as by the feldspar which is actually added to the batch.

But, in any event, it has been found desirable to maintain the content of iron oxide as low as possible in order that glass of good color (that is, free from the discoloring effect of iron oxide) will be produced. In fact, refractories embodying the invention have been produced from materials of the above character containing as low as .45% iron oxide. It is impractical to attempt to lower the iron oxide content below approximately .45% because that necessitates the use of starting materials which are too expensive for the economical and profitable manufacture of the glass contact refractories contemplated by this invention, in large quantities.

In order to insure that the novel refractory of the invention will contain between approximately 50% and 67% glassy matrix by volume, or between approximately 43% and 63% by weight, it is preferred to increase the silica content introduced by the clay or clay mixture, by the addition of the proper amount, and the proper kind of feldspar, consistent with high fusion point. This is desirable because as the amount of matrix is thus increased, its silica content is increased and the percentage of impurities therein is decreased, this yielding a matrix of high softening point, and having a low rate of solution in the molten glass, provided of course that the percentages of impurities in the body as a whole are kept within the limits above specified. Ordinarily my novel products will contain from approximately 1.5 to 5% more silica than the best grade kaolin refractory, and therefore will have a higher content of glassy matrix and at the same time a sufficiently high fusion point for use in molten glass. The batch ingredients are so selected as to yield a total of approximately 97% alumina and silica in the final product.

Tank blocks embodying the invention have given excellent service both in the manufacture of soda-lime glass and glasses more severe in their action on refractories such as boro-silicate glass. In such service, the blocks wear away very slowly and quite evenly, and the glass produced is of superior quality to that previously melted in tanks, being free from "stones" and other defects, and having exceptionally good color.

The resistance of my novel material to erosion is further evidenced by the unusually long life of orifice rings for glass feeders composed thereof.

It will be understood that substitutions in the batch, and variations in the finished body may be resorted to without departing from the scope of the claims.

I claim:

1. A batch for a ceramic refractory resistant to molten glass, comprising approximately 65 parts by weight of homogeneous granules of grog containing derivatives of approximately 92.5% of a mixture of Georgia Klondike kaolin and Georgia $G_1$ clay and approximately 7.5% Bedford feldspar fired to a temperature of approximately 2850° F., and having substantially the same physical and chemical characteristics as the refractory to be produced, and approximately 35 parts by weight raw binding material composed of approximately 92.5% of a mixture of Georgia Klondike kaolin and Georgia $G_1$ clay and approximately 7.5% Bedford feldspar, both the mixture and the feldspar being substantially the same as the mixture and feldspar from which the grog is derived.

2. A batch for a ceramic refractory resistant to molten glass, comprising not less than 65 parts by weight of homogeneous granules of grog containing derivatives of approximately 92.5% of a mixture of Georgia Klondike kaolin and Georgia $G_1$ clay and approximately 7.5% Bedford feldspar fired to a temperature of approximately 2850° F. and having substantially the same physical and chemical characteristics as the refractory to be produced, and not more than 35 parts by weight of raw binding material composed of approximately 92.5% of a mixture of Georgia Klondike kaolin and Georgia $G_1$ clay and approximately 7.5% Bedford feldspar, the composition of the binding material being substantially the same as the composition of the mixture from which the grog is derived.

3. A dense ceramic tank block substantially impermeable and resistant to molten glass, consisting wholly of a glassy matrix and microscopic crystals of mullite uniformly distributed therethrough, said glassy matrix containing no crystalline silica, said block containing approximately 44% alumina and approximately 53.5% silica, the silica content however being in excess of the silica content of dehydrated kaolin (which contains approximately 52% silica), said block containing a total of iron and alkali metal oxids ($Fe_2O_3$, $Na_2O$ and $K_2O$) not exceeding 1.5%, whereby the said block is highly resistant to the corrosive action of molten glass and does not substantially distort or discolor the glass, alkaline earth oxids (MgO and CaO) and titanium and other oxids being present only in the small proportions in which they occur as impurities in the clay and other materials from which the block is made, said block containing not less than 33% nor more than 50% of said microscopic mullite crystals and between 67% and 50% of said glassy matrix whereby said matrix has a low content of fluxes and is high in silica content and therefore highly resistant to solution in molten glass.

4. A dense ceramic tank block substantially impermeable to and resistant to molten glass, consisting wholly of a glassy matrix and microscopic crystals of mullite uniformly distributed therethrough, said glassy matrix containing no crystalline silica, said block containing approximately 44% alumina and approximately 53.5% silica, the silica content, however, being in excess of the silica content of dehydrated kaolin (which contains approximately 52% silica) said block containing a total of iron and alkali metal oxids ($Fe_2O_3$, $Na_2O$ and $K_2O$) not exceeding 1.5% and a total of said iron and alkali metal oxids and alkaline earth oxids (MgO and CaO) not exceeding approximately 2%, and being present with titanium and other oxids only in the small proportions in which they occur as impurities in the clay and other materials from which the block is made, said block containing not less than 33% nor more than 50% of said microscopic mullite crystals and between 67% and 50% of said glassy matrix, whereby said matrix has a low content of fluxes and is high in silica content, and therefore highly resistant to solution of molten glass.

5. A dense ceramic tank block substantially impermeable to and resistant to molten glass consisting wholly of a glassy matrix and microscopic crystals of mullite uniformly distributed therethrough, said crystals being well developed, elongated and of prismatic form, the maximum size of which is in the order of approximately 0.03 mm. x 0.006 mm., said glassy matrix containing no crystalline silica, said block containing approximately 44% alumina and approximately 53.5% silica, the silica content however being in excess of the silica content of dehydrated kaolin (which contains approximately 52% silica), said block containing a total of iron and alkali metal oxids ($Fe_2O_3$, $Na_2O$ and $K_2O$) not exceeding 1.5%, whereby the said block is highly resistant to the corrosive action of molten glass and does not substantially distort or discolor the glass, alkaline earth oxids (MgO and CaO) and titanium and other oxids being present only in the small proportions in which they occur as impurities in the clay and other materials from which the block is made, said block containing not less than 33%, nor more than 50%, of said microscopic mullite crystals and between 67% and 50% of said glassy matrix, whereby said matrix has a low content of fluxes and is high in silica content and therefore highly resistant to solution in molten glass.

6. A dense ceramic tank block substantially impermeable and resistant to molten glass, consisting wholly of a glassy matrix and microscopic crystals of mullite uniformly distributed therethrough, said glassy matrix containing no crystalline silica, said block containing not less than approximately 35% alumina and not more than approximately 62% silica, the silica content however being in excess of the silica content of dehydrated kaolin (which contains approximately 52% silica) said block containing a total of iron and alkali metal oxids ($Fe_2O_3$, $Na_2O$ and $K_2O$) not exceeding 1½%, whereby the said block is highly resistant to the corrosive action of molten glass and does not substantially distort or discolor the glass, alkaline earth oxids (MgO and CaO) and titanium and other oxids being present only in the small proportions in which they occur as impurities in the clay and other materials from which the block is made, said block containing from 40% to 75% of said glassy matrix whereby said matrix has a low content of fluxes and is high in silica content and therefore highly resistant to solution in molten glass.

PAUL G. WILLETTS.